United States Patent Office

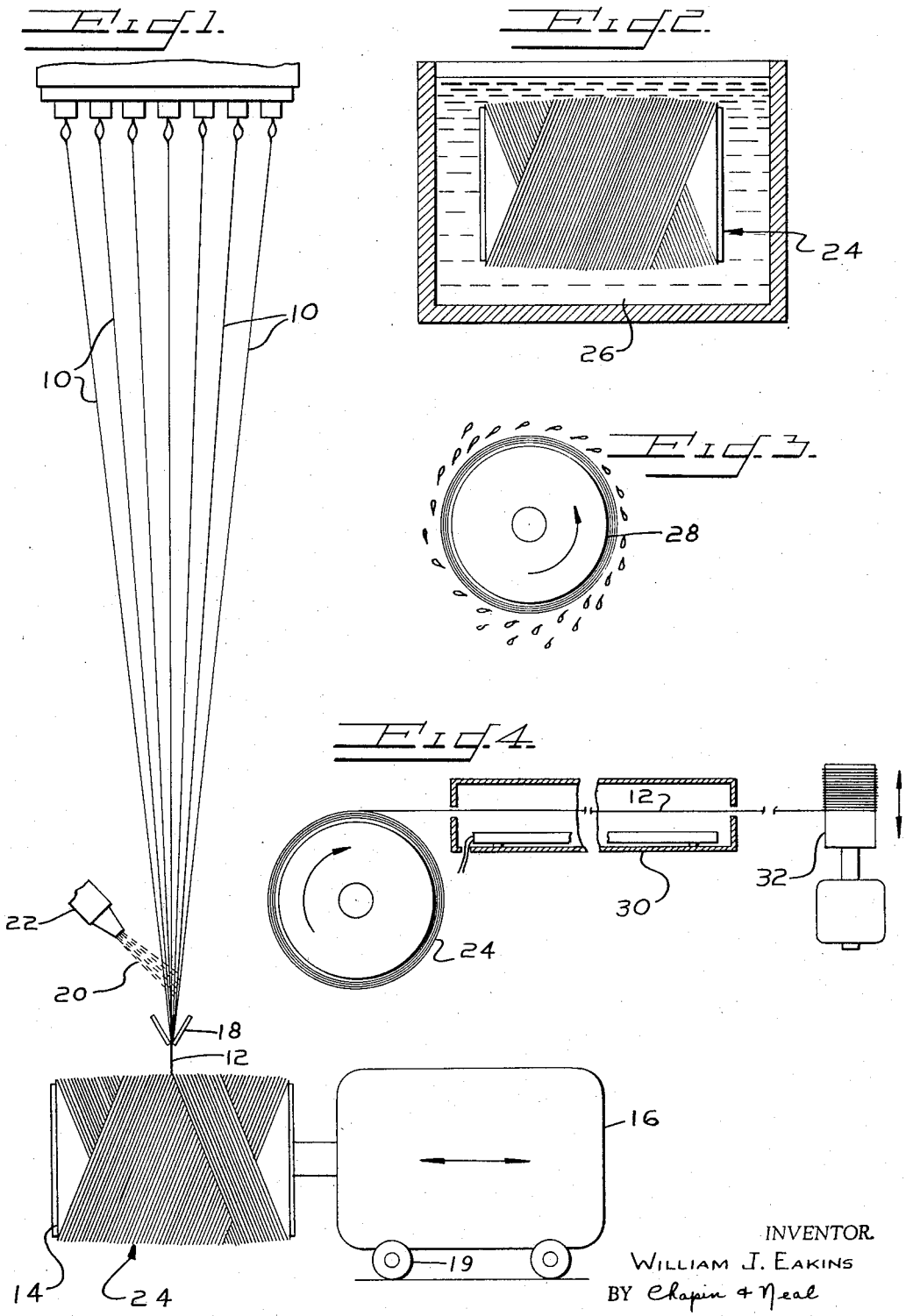

3,369,926
Patented Feb. 20, 1968

3,369,926
METHOD OF APPLYING GLASS-RESIN COUPLING COMPOSITIONS TO GLASS STRANDS
William J. Eakins, Wilbraham, Mass., assignor to De Bell & Richardson, Inc., Hazardville, Conn., a corporation of Connecticut
Filed Sept. 25, 1963, Ser. No. 311,496
8 Claims. (Cl. 117—67)

This invention relates to resin-bonded glass structures, and more particularly to improved methods for making such structures.

In the production of glass-resin lamninates, composites, and the like, coupling agents are applied to anchor the resin to the glass fiber surface. Such coupling agents are usually applied to the glass when it is in a clean condition, free of any foreign matter, surface coating, or layer which would act as a barrier to intimate contact with the glass. In this way good contact of the anchoring agent with the surface of the glass is insured. For this reason coupling agents may be applied to glass while in a nascent condition, as it is formed, or subsequently following a heat cleaning operation. Since filamentary glass is very friable some type of size, or handling agent is usually applied during forming.

Anchoring agents, per se, are not usually capable of providing the protection needed to enable glass to be handled in various subsequent production operations. While application of a size without coupling agent to glass during forming enhances its handling properties, the size must be removed, usually by heat cleaning, before a coupling agent is applied, the coupling agent providing means for bonding to a laminating resin. It will be realized, that the multiplicity of steps involved in such processes is very uneconomical.

The procedure, described above, has in recent years been improved by the formulation of polyfunctional compositions which protect the glass fibers for processing and also provide the coupling agent for application of the bonding resin.

Such compositions, disclosed in U.S. Patent No. 2,931,739, can be applied during forming of the glass or subsequently after the glass is wound on forming tubes. These bi-functional compositions serve both as anchoring agents and sizes providing many advantages over the prior art. The compositions are applied to glass in aqueous media and may comprise a glass-resin coupling composition, such as organo-silicon compound, a polyester resin and an emulsifying agent or surface active agent.

It has been found that the application of bi-functional compositions of the type described, although convenient, in the presence of ingredients having no function in the bonding of the glass to the resin, such as emulsifying agents, surface active agents and the like, tend to compete with the coupling agents for the active sites on the surface of the glass whereby insufficient bonding may result, with consequent poor strength transfer of stresses between the resin and the glass. Numerous attempts to overcome these drawbacks have been made by careful selection of emulsifying agents and by minimizing the quantities used.

Subsequent to the application of a treating composition, the cylindrical wet glass cake is usually dried in a batch oven at temperatures between 240 and 300° F. This batch dried, roll-wound glass, or multiple strand roving packages wound from it, is an article of commerce sold to manufacturers for the production of fiber glass articles. The glass may be sold on plastic or paper tubes on which it is wound during forming and subsequently dried. Glass thus formed is sometimes referred to in the art as a "cake." The glass may be unwound from its tube and rewound on a mandrel while applying a bonding resin. Glass-resin structures made in this way are then heated to cure the resin.

It is the principal object of this invention to provide an improved method for applying coupling agents to the surface of glass.

The above and other objects of this invention will be more readily apparent in the following description and in the accompanying drawing in which FIG. 1 is a diagrammatical elevational view showing the commencement of the process embodying this invention; and FIGS. 2, 3, and 4 are diagrammatical elevational views showing further steps involved in carrying out this invention.

A glass forming operation is shown in FIG. 1, in which molten glass flows through orifices in a crucible, referred to in the art as the bushing. Filaments of glass 10 are formed by attenuation from the globules of glass which form at the bushing orifices. The filaments are combined to form a strand 12 which is wound on a tube or roll 14, being driven by any suitable means, such as motor 16. The individual glass filaments are gathered together into a strand by suitable means, such as the guide 18 shown disposed above the wind-up roll 14. Means is provided for moving the strand relative to the wind-up roll in directions parallel to its axis so that the strand is uniformly "laid on" the roll. This, of course, facilitates unwinding with minimum danger of filament rupture. As shown, the motor 16 and roll 14 are mounted on a carriage 19, reciprocated by any suitable means, such for example as shown in my copending application Ser. No. 51,565, filed Aug. 24, 1960.

During the forming operation a glass-resin coupling agent 20 is applied to the filaments 10 which make up strand 12. In the embodiment shown, the coupler is applied by a spraying mechanism 22 which is directed to spray the filaments. The coupler may also be applied directly onto the glass carried on the roll.

In accordance with this invention the glass-resin coupling composition 20 is applied in a dilute aqueous solution. No resin, size, wetting or emulsifying agents need be included in the solution; the disperse phase may consist solely of coupling agent. It is important to appreciate that the novel process herein disclosed permits the application of coupler alone but does not negate the possibility of including size, if this is desired. The amount of coupling agent in solution is in the range of 0.5 to 3% by weight of the solvent. Preferably, the contents are in the range of 0.5 to 1.5% of the solvent, as compared with the prior art in which the total solids concentration of polyfunctional treating emulsions usually run well in excess of 5% by weight of the aqueous phase in order to obtain sufficient solids loading on the strand at commercial rates (12,000 ft./min.) of strand travel.

The following classes of glass-resin coupling agents are suitable for use in carrying out this invention in suitable solvent systems: alkyl alkoxy silanes, chlorosilanes and organo chromic chlorides. Specific examples of compounds within these classes which may be used in accordance with this invention include:

vinyl trialkoxy silane
vinyl trimethoxy silane
vinyl triethoxy silane, etc.
vinyl tri(methoxy ethoxy)silane amino alkyl trialkoxy silane
amino propyl triethoxy silane
(amino alkyl amino alkyl) trialkoxy silane
(amino ethyl amino propyl) trimethoxy silane
amino stearyl triethoxy silane
methacryloxy alkyl trialkoxy silane
methacryloxy propyl trimethoxy silane glycidoxy alkyl trialkoxy silane
glycidoxy propyl trimethoxy silane vinyl trichlorosilane
chloro vinyl trichlorosilanes
allyl resorcinoxy dichlorosilane methacrylato chromic chloride Together with these coupling agents, polymer-forming materials may be added, up to 50% of the solution solids, in order to give the strand increased body particularly when used with coupling agents such as organo chromic chlorides or glycidoxy propyl trimethoxy silane. Such additives are chosen to offer minimum competition to the coupling agent for the active sites on the glass surface. However, as mentioned above, the use of emulsifying and wetting agents is to be avoided. Since the solid coupling solutions embodying this invention have low solids concentrations, hydrocarbon resins, polyester resins, epoxy resins and polyvinyl acetate, usually applied by emulsification, are sufficiently soluble to be dissolved in the low solids coupling solution. Polyester resins of the type which may be used include propylene maleate, propylene succinate, butylene fumarate, diethylene itaconate. Hydrocarbon resins include polybutadiene-type resins such as Buton–500. Epoxy resins may be either the aliphatic cyclic or aromatic types in combination with amine, anhydride or phenyl formaldehyde hardeners and suitable catalysts.

Subsequent to the application of coupling agent during forming, a second application of coupling agent is made. When the roll-wound glass 24 is removed from the winding mechanism, it is immersed in a dilute solution of coupling agent 26, shown in FIG. 2, the same as sprayed on the glass. The glass is kept in the dilute coupler solution sufficient time to be wet through. It is removed and allowed to drain for a short time, then placed on a mandrel 28 and spun to remove excess liquid. Spinning is terminated before the glass is dry; to enable unwinding the strand without breakage.

The spinning rate of the mandrel 28 is on the order of 1,000 r.p.m.; this is a much lower speed than used by the wind-up mechanism in glass forming. Commercial glass forming rates on 6 inch diameter tubes are on the order of 6,000 r.p.m. Such high rotational speeds tend to prevent adequate application of the glass coupling composition to the strands because centrifugal force causes much of the coupling agent to be thrown off the glass or to migrate toward the outer layers of the glass strands where higher concentrations are found. The first application of coupler, in accordance with this invention, is adequate to moisten the glass as it is wound on the roll. This coupler application is important since it permits easy unwinding of the glass from the roll for the subsequent handling included in this process. The immersion of the glass-wound roll into the solution, shown in FIG. 2, insures complete application of the desired quantity of coupling agent.

An alternate to dipping the cake and spinning dry, the wet glass strand may be unwound at a relatively slow speed (1,000 ft./min.), passed over a pad wetted with size and continuously dried as detailed below.

After spinning to remove surplus moisture, the strand 12 is unwound from the roll 24, conducted through a heating chamber 30 and rewound on a roll or tube 32. The temperature in the chamber 30 depends on a temperature/time relationship related, of course, to the speed of advance of the glass and the length of the chamber. A temperature of 250° F. would suffice if the time of glass transit was one-half to one hour. A temperature of 700° F. for a period of a few seconds would achieve substantially the same result of moisture removal and coupling agent polymerization. Where an organo silane type of coupling agent is used, it will tend to polymerize through siloxane bonding. As a consequence of the polymerization, interfilament bridging occurs whereby the filaments of the strand are bonded together imparting integrity to the strand. Since the strand is dried as a continuous operation, it retains its individuality, in contrast to batch dried glass in which the glass convolutions of the roll tend to adhere to one another. Moreover, glass treated in the conventional batch process is subject to thermal migration when dried. That is, as the solvent, in which the size is applied, evaporates, it carries with it, towards the surface of the glass cake, a portion of the size. As a result a larger percentage of the size is found in the outer layer of the cake than the inner layers. This, of course, is a serious disadvantage in subsequent handling of the glass strands and also results in lack of uniformity in application of laminating resins in that they may fail to uniformly dissolve the size. Glass wound on the tube 32 is a suitable article of commerce used to produce glass-resin structure of various types.

The following examples are given by way of illustration of the advantages of this invention and the materials which may be used and are not to be considered as limiting of the scope of the invention:

*Example I*

A glass strand was sprayed, during its formation, with a solution of gamma amino propyl triethoxy silane known as A–1100 coupling agent. The solution consisted of 0.75% by weight of the silane in water which was applied to the strand as it was being wound on a 6 inch diameter plastic tube, as shown in FIG. 1. The wet cake, having about one pound of glass (dry weight) was then immersed in the same dilute A–1100 solution. The cake was removed and spun at 800 to 1,000 r.p.m. to remove excess solution. From the roll, while still wet, a strand was continuously drawn through an oven heated at 400–450° F. The transit time of the strand through the heating chamber was approximately 45 seconds and thereafter the strand was rewound on another tube, as shown in FIG. 4.

Subsequently the strand was made into a hoop by winding on a mandrel with the application of a mixture consisting of 100 parts of epoxy resin, i.e., Epon 828 and 91 parts methyl Nadic anhydride, 0.6 part dimethyl benzyl amine as catalyst. Epon 828 is a liquid resin which is diglycidyl ether of Bisphenol A having an epoxide equivalent expressed as grams of resin containing one-equivalent of epoxide, of 185–205 grams, and a viscosity at 25° C. of 13,500–19,500 cps. The hoop so prepared was cured by placing it in an oven at 250° F. for 14 hours, followed by 4 hours in the oven at 360° F. The hoop was then machined to a thickness of 0.060 inch and cut into strips one inch long. These strips were bent to failure between three bars, spaced ¼ inch apart, failure occurring in the neutral plane of the specimen. Other of the strips were immersed in boiling water for varying periods of time ranging from 12 to 169 hours. Shear strength tests were also conducted on the boiled samples with the following results:

| Time immersed in boiling water: | Shear strength after immersion in boiling water, p.s.i. |
|---|---|
| Dry (none) | 10,900 |
| 12 hours | 10,700 |
| 72 hours | 10,750 |
| 169 hours | 10,950 |

Unexpectedly it was found that the shear strength was substantially unchanged even after extensive immersion of the strips in boiling water.

*Example II*

E glass (Owens-Corning Fiber Glass Designation 801) was used to produce additional hoop test specimens. The E glass was commercially sized with a formulation of A–1100 coupling agent together with sizing ingredients, the disperse phase being approximately 5% or more in an aqueous medium. The glass comes commercially wound on a spool which has been dried by a batch process. This glass was used to make a hoop in the same manner as described in Example I; the identical resin mixture was used. The same shear tests were conducted using strips of the hoop as described above with the following results:

| Time immersed in boiling water: | Shear strength after immersion in boiling water, p.s.i. |
|---|---|
| Dry (none) | 8,000 |
| 12 hours | 7,900 |
| 72 hours | 1,000 |

*Example III*

During forming a glass strand was drawn over an applicator pad containing in an aqueous medium 5% by weight A–1100 only. The strand was used to form hoops, as described in Example I. These were also tested with the following results:

| Time immersed in boiling water: | Shear strength after immersion in boiling water, p.s.i. |
|---|---|
| Dry (none) | 8,000 |
| 12 hours | 4,700 |

*Example IV*

The method of Example III was prepared except that a 10% by weight aqueous solution of A–1100 was applied to the glass strand as it was formed. The strand was again made into a hoop and tested for shear strength with the following results:

| Time immersed in boiling water: | Shear strength after immersion in boiling water, p.s.i. |
|---|---|
| Dry (none) | 7,200 |
| 12 hours | 4,600 |

The above examples show that remarkable improvement is obtained by the process embodying this invention. It is postulated that the improvement is attributable to a number of factors. In conventional practice moisture is evaporated during batch heating of the cake carrying the coupling compound toward the surface of the glass layers. Similarly by allowing a wet cake to dry while standing, the coupling agent settles to the bottom of the layers of glass. On the other hand by spinning the wet cake prior to drying and by drying as a continuous operation a high degree of uniformity in the distribution of the coupler is attained whereby uniform high structural strength in laminates results.

In accordance with this invention, the application of very dilute coupling solutions of the glass as it is being formed is important because during forming the reactive sites of the glass have a high affinity for coupling compounds. The continuous drying produces glass strands with coupling agent applied with maximum uniformity. Immersion in the dilute solution comprises the second and complete application of the coupler to the glass and moistens the glass so that it can be readily unwound and dried and cured as a continuous operation.

Having thus described this invention, what is claimed is:

1. Method of treating glass fiber strands for impregnation and coating with resin in making glass-resin composite structures of improved physical strength which comprises
    (1) applying a treating solution to the glass filaments which form the strands as the filaments are being formed,
        (a) said treating solution consisting essentially of water and a coupling agent selected from the group consisting of alkyl alkoxy silanes, chlorosilanes and organo chromic chlorides,
    (2) winding the strands, and spinning said roll-wound glass strands to remove surplus treating solution, onto a roll,
    (3) again applying said treating solution to said strands,
    (4) unwinding said strands from said roll while the strands are still moist,
    (5) heating said strands, and
    (6) rewinding said strands onto a roll to form a glass strand package.

2. Method as set forth in claim 1 wherein said coupling agent is present in said treating solution in amounts of from 0.5% to 3% by weight.

3. Method of treating glass fiber strands for use in the manufacture of glass-resin composite structures of improved physical strength which comprises
    (1) applying a treating solution to the glass filaments which form the strands as the filaments are being formed,
        (a) said treating solution consisting essentially of water and a coupling agent,
    (2) winding the strands onto a roll,
    (3) immersing the roll-wound glass strands in said treating solution until said strands are wet through,
    (4) removing the roll-wound glass strands from said treating solution and spinning same to remove surplus treating solution,
    (5) unwinding said strands from said roll while said strands are still moist,
    (6) conducting said strands through a heating chamber, and
    (7) rewinding said strands to form a glass strand package.

4. Method of making glass fiber strands for use in the manufacture of glass-resin structures and the like, as set forth in claim 3 in which said coupling agent is an alkyl alkoxy silane.

5. Method of making glass fiber strands for use in the manufacture of glass-resin structures and the like, as set forth in claim 3 in which said coupling agent is gamma amino propyl triethoxy silane.

6. Method of making glass fiber strands for use in the manufacture of glass-resin structures and the like, as set forth in claim 3 in which said coupling agent is a chlorosilane.

7. Method of making glass fiber strands for use in the manufacture of glass-resin structures and the like, as set forth in claim 3 in which said coupling agent is organo chromic chloride.

8. Method of treating glass fiber strands which comprises
    (1) applying a treating solution to the glass filaments which form the strands as the filaments are being formed from a molten condition,
        (a) said treating solution consisting essentially of water and a coupling agent,
    (2) winding the strands onto a roll and immediately before allowing the strands to dry, unwinding the strands from said roll,
    (3) applying said treating solution to said strands,
    (4) conducting the strands through a heating chamber, and
    (5) rewinding the strands to form a glass strand package.

References Cited

UNITED STATES PATENTS

| 2,888,363 | 5/1959 | Matter et al. | 117—102 X |
| 2,931,739 | 4/1960 | Marzocchi et al. | 117—126 |
| 2,946,698 | 7/1960 | Brunnick et al. | 117—126 X |
| 2,994,619 | 8/1961 | Eilerman | 117—126 |
| 3,206,924 | 9/1965 | Mennerich | 117—126 |

ALFRED L. LEAVITT, *Primary Examiner.*

H. COHEN, *Assistant Examiner.*